(12) United States Patent
Deka et al.

(10) Patent No.: US 11,009,288 B2
(45) Date of Patent: May 18, 2021

(54) INSULATION STRUCTURE FOR AN APPLIANCE HAVING A UNIFORMLY MIXED MULTI-COMPONENT INSULATION MATERIAL, AND A METHOD FOR EVEN DISTRIBUTION OF MATERIAL COMBINATIONS THEREIN

(71) Applicant: WHIRLPOOL CORPORATION, Benton Harbor, MI (US)

(72) Inventors: Lakshya J. Deka, Mishawaka, IN (US); Rameet Singh Grewal, Pune (IN); Diptesh Mukherjee, Pune (IN); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/534,384

(22) Filed: Aug. 7, 2019

(65) Prior Publication Data
US 2019/0360743 A1 Nov. 28, 2019

Related U.S. Application Data

(62) Division of application No. 14/961,939, filed on Dec. 8, 2015, now Pat. No. 10,422,573.

(51) Int. Cl.
*F25D 23/06* (2006.01)
*F16L 59/065* (2006.01)

(52) U.S. Cl.
CPC ......... *F25D 23/068* (2013.01); *F25D 23/062* (2013.01); *F16L 59/065* (2013.01);
(Continued)

(58) Field of Classification Search
CPC ...... F25D 23/06; F25D 23/062; F25D 23/066; F25D 23/068; F17C 3/02
(Continued)

(56) References Cited

U.S. PATENT DOCUMENTS 1,275,511 A 8/1918 Welch
1,718,507 A 6/1929 Wenzel et al.
(Continued)

FOREIGN PATENT DOCUMENTS

CA 626838 A 5/1961
CA 1320631 7/1993
(Continued)

OTHER PUBLICATIONS

Kitchen Aid, "Refrigerator User Instructions," 120 pages, published Sep. 5, 2015.
(Continued)

*Primary Examiner* — James O Hansen
(74) *Attorney, Agent, or Firm* — Price Heneveld LLP

(57) ABSTRACT

An insulation structure for an appliance includes a cabinet having an outer wrapper and an inner liner, with an insulating cavity defined therebetween. Insulating powder material is disposed substantially throughout the insulating cavity. An insulating gas is disposed within the insulating cavity, wherein the insulating powder material is combined with the insulating gas and cooperatively defines a suspended state and a precipitated state. The suspended state is defined by the insulating gas in motion and the insulating powder being in an aeolian suspension within the insulating gas while in motion. The precipitated state is defined by the insulating gas being in a deposition state and the insulating powder being precipitated from the insulating gas and deposited within the insulating cavity.

16 Claims, 13 Drawing Sheets

(52) U.S. Cl.
CPC .. *F25D 2201/122* (2013.01); *F25D 2201/124* (2013.01); *F25D 2201/14* (2013.01); *F25D 2201/30* (2013.01); *Y02B 40/00* (2013.01); *Y10S 977/773* (2013.01); *Y10S 977/902* (2013.01)

(58) Field of Classification Search
USPC .......... 312/400, 401, 406; 220/592.09, 592.2
See application file for complete search history.

(56) References Cited

U.S. PATENT DOCUMENTS

| | | | |
|---|---|---|---|
| 1,849,369 A | 3/1932 | Frost | |
| 1,921,576 A | 8/1933 | Muffly | |
| 2,108,212 A | 2/1938 | Schellens | |
| 2,128,336 A | 8/1938 | Torstensson | |
| 2,164,143 A | 6/1939 | Munters | |
| 2,191,659 A | 2/1940 | Hintze | |
| 2,318,744 A | 5/1943 | Brown | |
| 2,356,827 A | 8/1944 | Coss et al. | |
| 2,432,042 A | 12/1947 | Richard | |
| 2,439,602 A | 4/1948 | Heritage | |
| 2,439,603 A | 4/1948 | Heritage | |
| 2,451,884 A | 10/1948 | Stelzer | |
| 2,538,780 A | 1/1951 | Hazard | |
| 2,559,356 A | 7/1951 | Hedges | |
| 2,660,564 A | 11/1953 | Davis | |
| 2,729,863 A | 1/1956 | Kurtz | |
| 2,768,046 A | 10/1956 | Evans | |
| 2,817,123 A | 12/1957 | Jacobs | |
| 2,942,438 A | 6/1960 | Schmeling | |
| 2,985,075 A | 5/1961 | Knutsson-Hall | |
| 3,086,830 A | 4/1963 | Malia | |
| 3,125,388 A | 3/1964 | Constantini et al. | |
| 3,137,900 A | 6/1964 | Carbary | |
| 3,218,111 A | 11/1965 | Steiner | |
| 3,258,883 A | 7/1966 | Companaro et al. | |
| 3,290,893 A | 12/1966 | Haldopoulos | |
| 3,338,451 A | 8/1967 | Kesling | |
| 3,353,301 A | 11/1967 | Heilweil et al. | |
| 3,353,321 A | 11/1967 | Heilweil et al. | |
| 3,358,059 A | 12/1967 | Snyder | |
| 3,379,481 A | 4/1968 | Fisher | |
| 3,408,316 A | 10/1968 | Mueller et al. | |
| 3,471,416 A | 10/1969 | Fijal | |
| 3,597,850 A | 8/1971 | Jenkins | |
| 3,607,169 A | 9/1971 | Coxe | |
| 3,632,012 A | 1/1972 | Kitson | |
| 3,633,783 A | 1/1972 | Aue | |
| 3,634,971 A | 1/1972 | Kesling | |
| 3,635,536 A | 1/1972 | Lackey et al. | |
| 3,670,521 A | 6/1972 | Dodge, III et al. | |
| 3,688,384 A | 9/1972 | Mizushima et al. | |
| 3,769,770 A | 11/1973 | Deschamps et al. | |
| 3,862,880 A | 1/1975 | Feldman | |
| 3,868,829 A | 3/1975 | Mann et al. | |
| 3,875,683 A | 4/1975 | Waters | |
| 3,910,658 A | 10/1975 | Lindenschmidt | |
| 3,933,398 A | 1/1976 | Haag | |
| 3,935,787 A | 2/1976 | Fisher | |
| 4,005,919 A | 2/1977 | Hoge et al. | |
| 4,006,947 A | 2/1977 | Haag et al. | |
| 4,043,624 A | 8/1977 | Lindenschmidt | |
| 4,050,145 A | 9/1977 | Benford | |
| 4,067,628 A | 1/1978 | Sherbum | |
| 4,170,391 A | 10/1979 | Bottger | |
| 4,242,241 A | 12/1980 | Rosen et al. | |
| 4,260,876 A | 4/1981 | Hochheiser | |
| 4,272,935 A | 6/1981 | Lukas et al. | |
| 4,303,730 A | 12/1981 | Torobin | |
| 4,303,732 A | 12/1981 | Torobin | |
| 4,325,734 A | 4/1982 | Burrage et al. | |
| 4,330,310 A | 5/1982 | Tate, Jr. et al. | |
| 4,332,429 A | 6/1982 | Frick et al. | |
| 4,396,362 A | 8/1983 | Thompson et al. | |
| 4,417,382 A | 11/1983 | Schiff | |
| 4,492,368 A | 1/1985 | DeLeeuw et al. | |
| 4,529,368 A | 7/1985 | Makansi | |
| 4,529,638 A * | 7/1985 | Yamamoto | B32B 5/16 428/69 |
| 4,548,196 A | 10/1985 | Torobin | |
| 4,554,041 A * | 11/1985 | Schreier | F16L 59/04 138/149 |
| 4,583,796 A | 4/1986 | Nakajima et al. | |
| 4,660,271 A | 4/1987 | Lenhardt | |
| 4,671,909 A | 6/1987 | Torobin | |
| 4,671,985 A | 6/1987 | Rodrigues et al. | |
| 4,681,788 A | 7/1987 | Barito et al. | |
| 4,745,015 A | 5/1988 | Cheng et al. | |
| 4,777,154 A | 10/1988 | Torobin | |
| 4,781,968 A | 11/1988 | Kellerman | |
| 4,805,293 A | 2/1989 | Buchser | |
| 4,865,875 A | 9/1989 | Kellerman | |
| 4,870,735 A | 10/1989 | Jahr et al. | |
| 4,914,341 A | 4/1990 | Weaver et al. | |
| 4,917,841 A | 4/1990 | Jenkins | |
| 5,007,226 A | 4/1991 | Nelson | |
| 5,018,328 A | 5/1991 | Cur et al. | |
| 5,033,636 A | 7/1991 | Jenkins | |
| 5,066,437 A | 11/1991 | Barito et al. | |
| 5,082,335 A | 1/1992 | Cur et al. | |
| 5,084,320 A | 1/1992 | Barito et al. | |
| 5,094,899 A | 3/1992 | Rusek, Jr. | |
| 5,118,174 A | 6/1992 | Benford et al. | |
| 5,121,593 A | 6/1992 | Forslund | |
| 5,168,674 A | 12/1992 | Molthen | |
| 5,171,346 A | 12/1992 | Hallett | |
| 5,175,975 A | 1/1993 | Benson et al. | |
| 5,212,143 A | 5/1993 | Torobin | |
| 5,221,136 A | 6/1993 | Hauck et al. | |
| 5,227,245 A | 7/1993 | Brands et al. | |
| 5,231,811 A | 8/1993 | Andrepont et al. | |
| 5,248,196 A | 9/1993 | Lynn et al. | |
| 5,251,455 A | 10/1993 | Cur et al. | |
| 5,252,408 A | 10/1993 | Bridges et al. | |
| 5,263,773 A | 11/1993 | Gable et al. | |
| 5,273,801 A | 12/1993 | Barry et al. | |
| 5,340,208 A | 8/1994 | Hauck et al. | |
| 5,353,868 A | 10/1994 | Abbott | |
| 5,359,795 A | 11/1994 | Mawby et al. | |
| 5,375,428 A | 12/1994 | LeClear et al. | |
| 5,397,759 A | 3/1995 | Torobin | |
| 5,418,055 A | 5/1995 | Chen et al. | |
| 5,500,287 A | 3/1996 | Henderson | |
| 5,500,305 A | 3/1996 | Bridges et al. | |
| 5,505,810 A | 4/1996 | Kirby et al. | |
| 5,507,999 A | 4/1996 | Copsey et al. | |
| 5,509,248 A | 4/1996 | Dellby et al. | |
| 5,512,345 A | 4/1996 | Tsutsumi et al. | |
| 5,532,034 A | 7/1996 | Kirby et al. | |
| 5,533,311 A | 7/1996 | Tirrell et al. | |
| 5,586,680 A | 12/1996 | Dellby et al. | |
| 5,599,081 A | 2/1997 | Revlett et al. | |
| 5,600,966 A | 2/1997 | Valence et al. | |
| 5,632,543 A | 5/1997 | McGrath et al. | |
| 5,640,828 A | 6/1997 | Reeves et al. | |
| 5,652,039 A | 7/1997 | Tremain et al. | |
| 5,716,581 A | 2/1998 | Tirrell et al. | |
| 5,768,837 A | 6/1998 | Sjoholm | |
| 5,792,801 A | 8/1998 | Tsuda et al. | |
| 5,826,780 A | 10/1998 | Messer et al. | |
| 5,827,385 A | 10/1998 | Meyer et al. | |
| 5,834,126 A | 11/1998 | Sheu | |
| 5,843,353 A | 12/1998 | DeVos et al. | |
| 5,857,277 A * | 1/1999 | Mayze | G09F 19/02 40/409 |
| 5,866,228 A | 2/1999 | Awata | |
| 5,866,247 A | 2/1999 | Klatt et al. | |
| 5,868,890 A | 2/1999 | Fredrick | |
| 5,900,299 A | 5/1999 | Wynne | |
| 5,918,478 A | 7/1999 | Bostic et al. | |
| 5,924,295 A | 7/1999 | Park | |
| 5,950,395 A | 9/1999 | Takemasa et al. | |
| 5,952,404 A | 9/1999 | Simpson et al. | |

(56) References Cited

U.S. PATENT DOCUMENTS

| | | |
|---|---|---|
| 5,966,963 A | 10/1999 | Kovalaske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,263,600 B1 * | 7/2001 | Brink ............... G09F 13/24 40/409 |
| 6,266,970 B1 | 7/2001 | Nam et al. |
| 6,294,595 B1 | 9/2001 | Tyagi et al. |
| 6,305,768 B1 | 10/2001 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,905,614 B2 | 3/2011 | Aoki |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Niemeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,491,070 B2 | 7/2013 | Davis et al. |
| 8,516,845 B2 | 8/2013 | Wuesthoff et al. |
| 8,522,563 B2 | 9/2013 | Allard et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,038,403 B2 | 5/2015 | Cur et al. |
| 9,056,952 B2 | 6/2015 | Eilbracht et al. |
| 9,071,907 B2 | 6/2015 | Kuehl et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,182,158 B2 | 11/2015 | Wu |
| 9,188,382 B2 | 11/2015 | Kim et al. |

(56) References Cited

U.S. PATENT DOCUMENTS

| | | |
|---|---|---|
| 8,955,352 B2 | 12/2015 | Lee et al. |
| 9,221,210 B2 | 12/2015 | Wu et al. |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0240612 A1 | 9/2012 | Wuesthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0346942 A1 | 11/2014 | Kim et al. |
| 2014/0364527 A1 | 12/2014 | Matthias et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |

(56) References Cited

U.S. PATENT DOCUMENTS

| | | | |
|---|---|---|---|
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Niemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 7/2004 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 5/2012 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 4110292 A1 | 10/1992 |
| DE | 4409091 | 9/1995 |
| DE | 69401889 | 9/1997 |
| DE | 19818890 | 11/1999 |
| DE | 19914105 | 9/2000 |
| DE | 19915311 | 10/2000 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0260699 | 3/1988 |
| EP | 0480451 | 4/1992 |
| EP | 0645576 A2 | 3/1995 |
| EP | 0691518 | 1/1996 |
| EP | 0860669 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1624263 A2 | 8/2006 |
| EP | 1484563 | 10/2008 |
| EP | 2342511 | 8/2012 |
| EP | 2543942 A2 | 1/2013 |
| EP | 2607073 | 6/2013 |
| EP | 2789951 | 10/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | S61168400 | 10/1986 |
| JP | 03013779 | 1/1991 |
| JP | 404165197 | 6/1992 |
| JP | 04165197 | 10/1992 |
| JP | 04309778 A | 11/1992 |
| JP | 06159922 | 6/1994 |
| JP | 7001479 | 1/1995 |
| JP | H07167377 | 7/1995 |
| JP | 08300052 | 11/1996 |
| JP | H08303686 | 11/1996 |
| JP | H09166271 | 6/1997 |
| JP | 10113983 | 5/1998 |
| JP | 11159693 A | 6/1999 |
| JP | 11311395 | 11/1999 |
| JP | 11336990 | 12/1999 |
| JP | 2000097390 | 4/2000 |
| JP | 2000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 | 8/2003 |
| JP | 03478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006077792 | 3/2006 |
| JP | 2006161832 | 6/2006 |
| JP | 2006161834 A | 6/2006 |
| JP | 2006161945 | 6/2006 |
| JP | 037928010 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 045451286 B2 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 04779684 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2012087993 | 5/2012 |
| JP | 2012163258 | 8/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 1020080103845 | 11/2008 |
| KR | 20090026045 | 3/2009 |
| KR | 1017776 | 2/2011 |

(56) References Cited

FOREIGN PATENT DOCUMENTS

| | | |
|---|---|---|
| KR | 20120007241 | 1/2012 |
| KR | 2012046621 | 5/2012 |
| KR | 2012051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 | 6/1999 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 9721767 | 6/1997 |
| WO | 1998049506 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 199920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 03089729 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 | 1/2009 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2010007783 A1 | 1/2012 |
| WO | 2012023705 | 2/2012 |
| WO | 2012026715 | 3/2012 |
| WO | 2012031885 | 3/2012 |
| WO | 2012044001 | 4/2012 |
| WO | 2012043990 | 5/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Cai et al., "Generation of Metal Nanoparticles by Laser Ablation of Microspheres," J. Aerosol Sci., vol. 29, No. 5/6 (1998), pp. 627-636.
Raszewski et al., "Methods for Producing Hollow Glass Microspheres," Powerpoint, cached from Google, Jul. 2009, 6 pages.
BASF, "Balindur™ Solutions for fixing Vaccum Insulated Panels," web page, 4 pages, date unknown, http://performance-materials.basf.us/products/view/family/balindur, at least as early as Dec. 21, 2015.
BASF, "Balindur™," web page, 2 pages, date unknown, http://product-finder.basf.com/group/corporate/product-finder/en/brand/BALINDUR, at least as early as Dec. 21, 2015.
PU Solutions Elastogram, "Balindur™ masters the challenge," web page, 2 pages, http://product-finder.basf.com/group/corporate/product-finder/en/literature-document:/Brand+Balindur-Flyer--Balindur+The+new+VIP+fixation+technology-English.pdf, Dec. 21, 2014.

* cited by examiner

Method 500 for Forming an Insulation Member within an Insulating Structure

```
                        ┌─ 502
    ┌──────────────────────────────────────┐
    │    Forming a powder insulation material │
    └──────────────────────────────────────┘
                        │
                        ▼          ┌─ 504
    ┌──────────────────────────────────────────────┐
    │ Suspending the powder insulation material within an │
    │ insulating gas carrier to form an aeolian suspension │
    └──────────────────────────────────────────────┘
                        │
                        ▼          ┌─ 506
    ┌──────────────────────────────────────────────┐
    │   Disposing the aeolian suspension within an    │
    │ insulating cavity defined within an insulating structure │
    └──────────────────────────────────────────────┘
                        │
                        ▼                          ┌─ 508
  ┌──────────────────────────────────────────────────────┐
  │ Expressing gas and a portion of the insulating gas carrier from the │
  │ insulating cavity to circulate the aeolian suspension through the insulating cavity │
  └──────────────────────────────────────────────────────┘
                        │
                        ▼          ┌─ 510
    ┌──────────────────────────────────────────────┐
    │   Precipitating the powder insulating material from the │
    │  aeolian suspension for deposition in the insulating cavity │
    └──────────────────────────────────────────────┘
                        │
                        ▼          ┌─ 512
    ┌──────────────────────────────────────────────┐
    │ Sealing the powder insulation material and the insulating gas carrier │
    │   within the insulating cavity to define a vacuum insulated structure │
    └──────────────────────────────────────────────┘
```

FIG. 16

INSULATION STRUCTURE FOR AN APPLIANCE HAVING A UNIFORMLY MIXED MULTI-COMPONENT INSULATION MATERIAL, AND A METHOD FOR EVEN DISTRIBUTION OF MATERIAL COMBINATIONS THEREIN

CROSS-REFERENCE TO RELATED APPLICATION

The present application is a divisional of U.S. patent application Ser. No. 14/961,939 filed Dec. 8, 2015, entitled INSULATION STRUCTURE FOR AN APPLIANCE HAVING A UNIFORMLY MIXED MULTI COMPONENT INSULATION MATERIAL, AND A METHOD FOR EVEN DISTRIBUTION OF MATERIAL COMBINATIONS THEREIN, now U.S. Pat. No. 10,422,573, the entire disclosure of which is hereby incorporated herein by reference.

BACKGROUND

The device is in the field of insulating materials for various household appliances, specifically, a multi-component insulation material that is uniformly distributed throughout an insulating cavity for the appliance.

SUMMARY

In at least one aspect, an insulation structure for an appliance includes a cabinet having an outer wrapper and an inner liner, with an insulating cavity defined therebetween. A plurality of hollow insulating spheres is disposed within the insulating cavity, wherein a secondary insulating volume is defined between the plurality of hollow insulating spheres and an interior surface of the cabinet. The interior surface of the cabinet defines the insulating cavity. An insulating fill material disposed within the secondary insulating volume, wherein the insulating fill material and the plurality of hollow insulating spheres define a substantially uniform insulating material.

In at least another aspect, a method of forming an insulating structure includes forming an insulating member, wherein the insulating member includes an interior surface that defines an interior insulating cavity. The method also includes forming a plurality of hollow insulating spheres and forming a fill material, wherein the fill material is defined by a nano-sized particulate or powder material. The method also includes disposing the hollow insulating spheres and the nano/micro-sized particulate material within the interior insulating cavity. The method also includes dispersing the nano/micro-sized particulate material throughout a secondary insulating volume defined within the interior insulating cavity and within the interstitial space defined between the plurality of hollow insulating spheres, wherein the nano/micro-sized particulate material and the hollow insulating spheres at least partially define a substantially uniform insulating material.

In at least another aspect, a method of forming an insulating material to be used in an insulating structure of an appliance includes forming a plurality of hollow insulating spheres, wherein a secondary insulating volume is defined within an interstitial space defined between the plurality of hollow insulating spheres. The method also includes forming a fill material, wherein the fill material is defined by a nano/micro-sized particulate material. The method also includes dispersing the nano/micro-sized particulate material throughout a secondary insulating volume, wherein the nano/micro-sized particulate material and the hollow insulating spheres at least partially define a substantially uniform insulating material.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 16 is a schematic flow diagram illustrating a method for forming insulating material to be used in an insulating structure of an appliance;

DETAILED DESCRIPTION OF EMBODIMENTS

Figure 1:
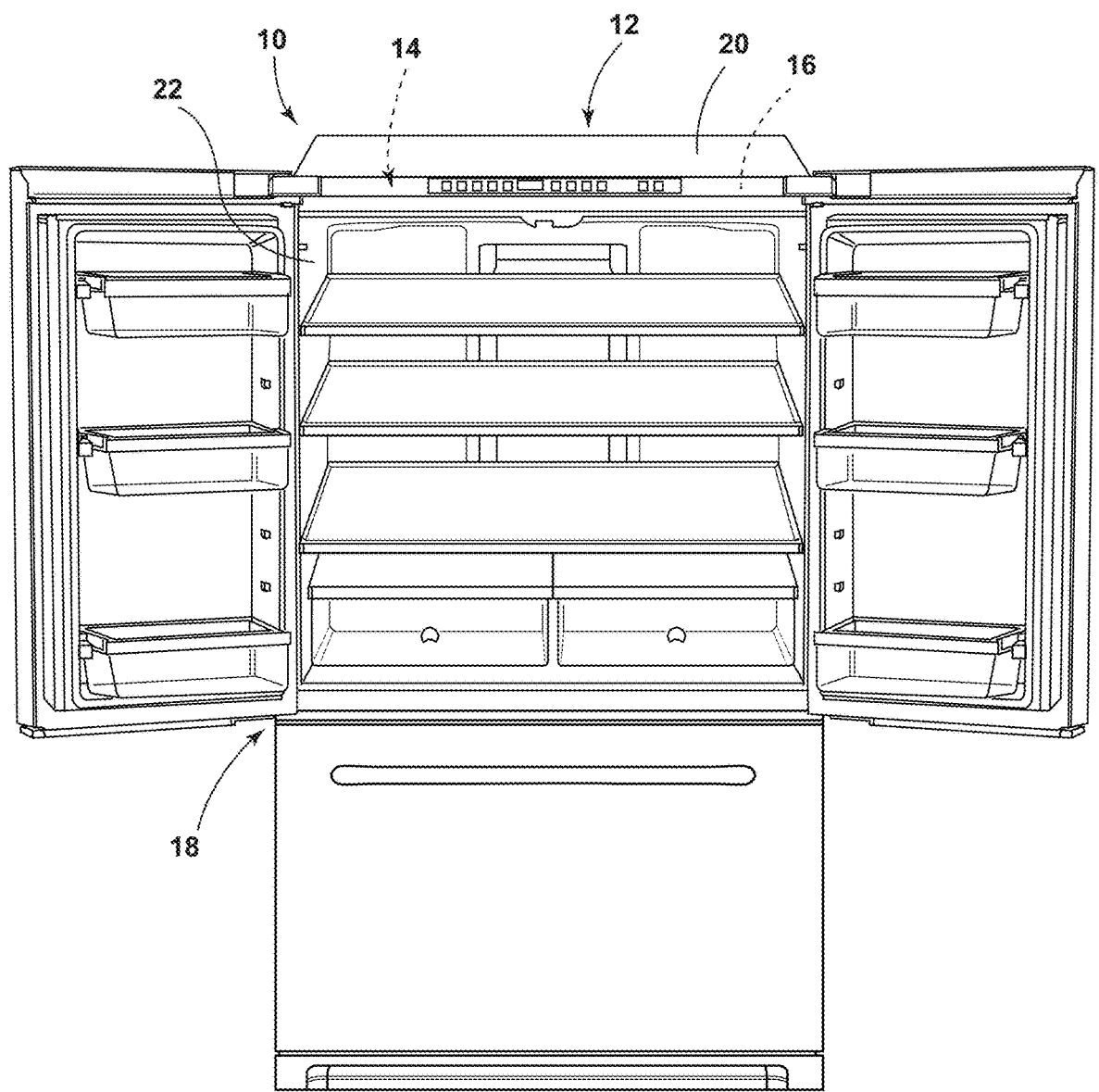
FIG. 1 is a front perspective view of an appliance incorporating an aspect of the multi-component insulation material.
Figure 2:
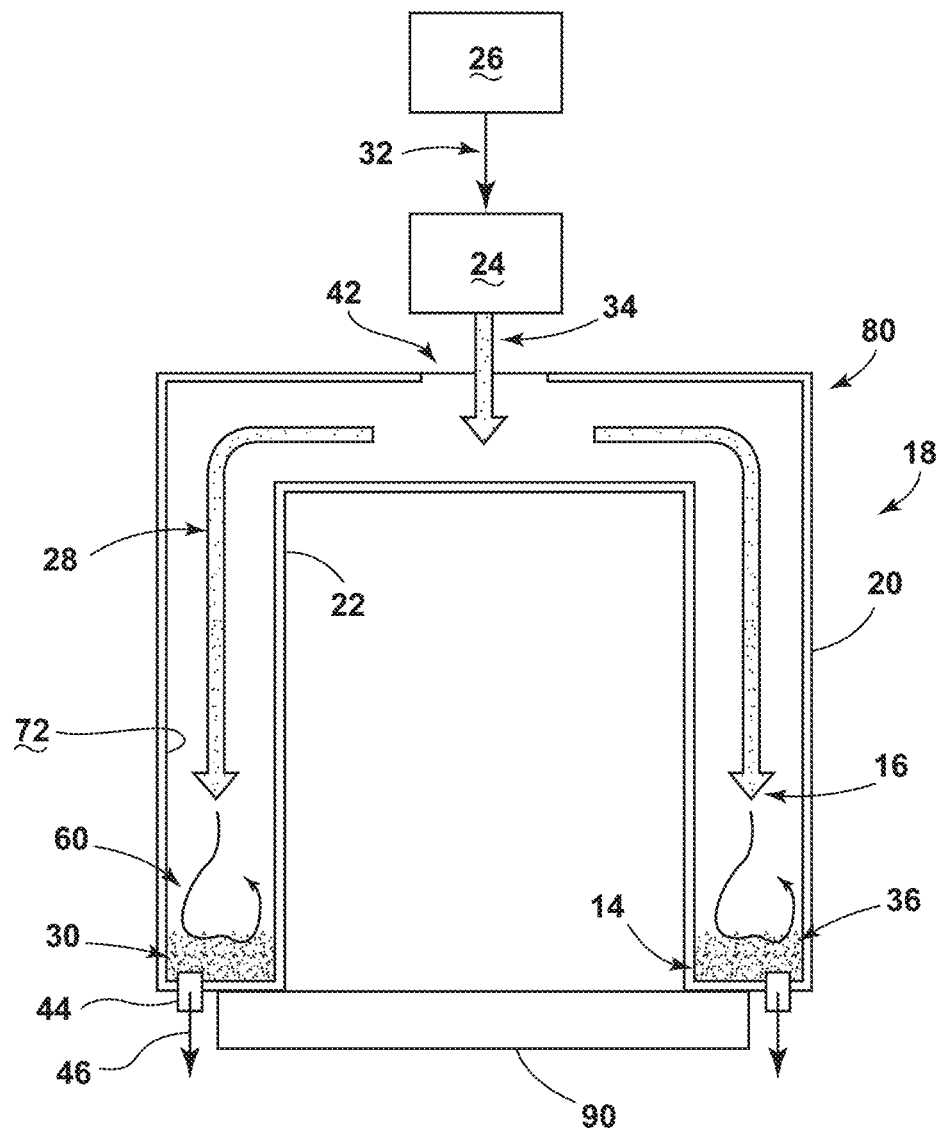
FIG. 2 is a schematic section view of a device for depositing and evenly distributing an aspect of the multi-component insulation material evenly throughout the insulating cavity.
Figure 3:
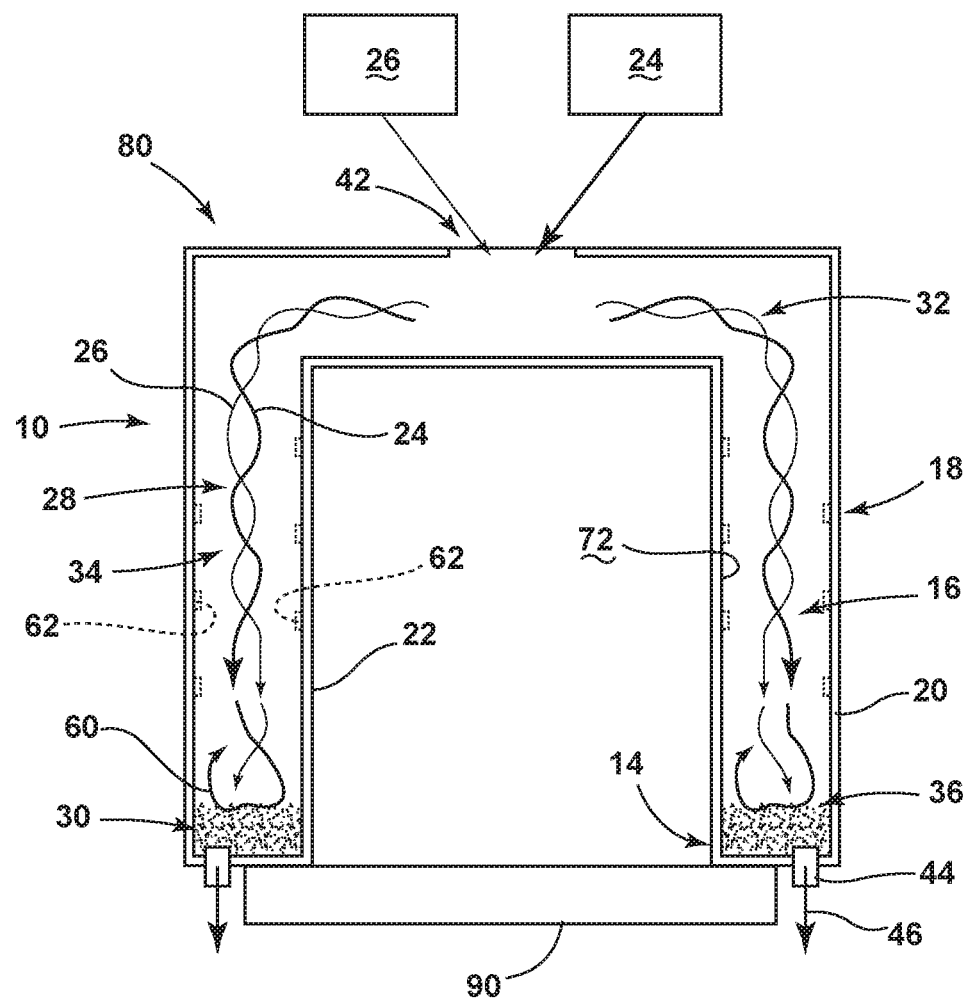
FIG. 3 is a schematic section view of a device for depositing and evenly distributing an aspect of the multi-component insulation material evenly throughout the insulating cavity.
Figure 4:
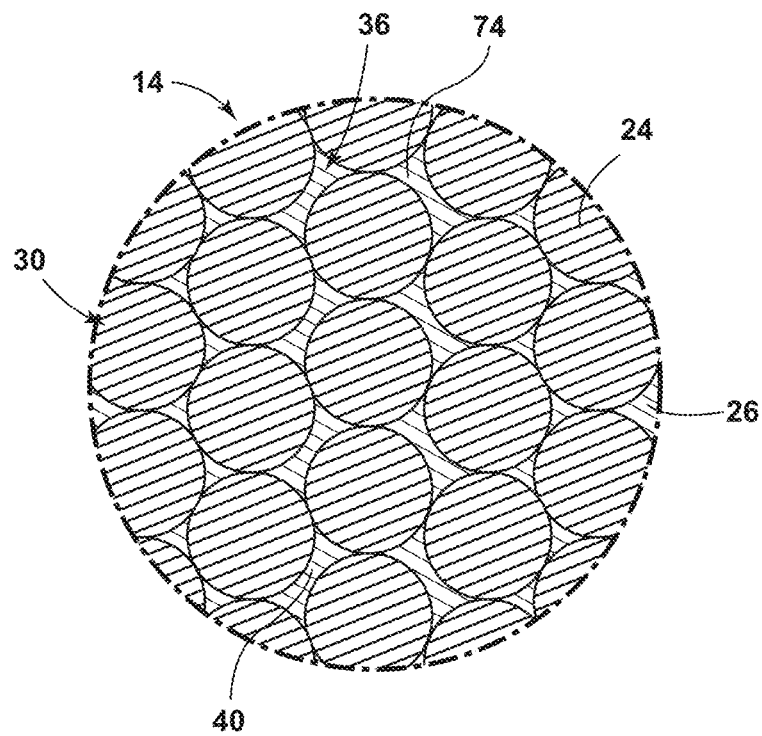
FIG. 4 is an enlarged cross-sectional view of an aspect of the multi-component insulation material.
Figure 5:
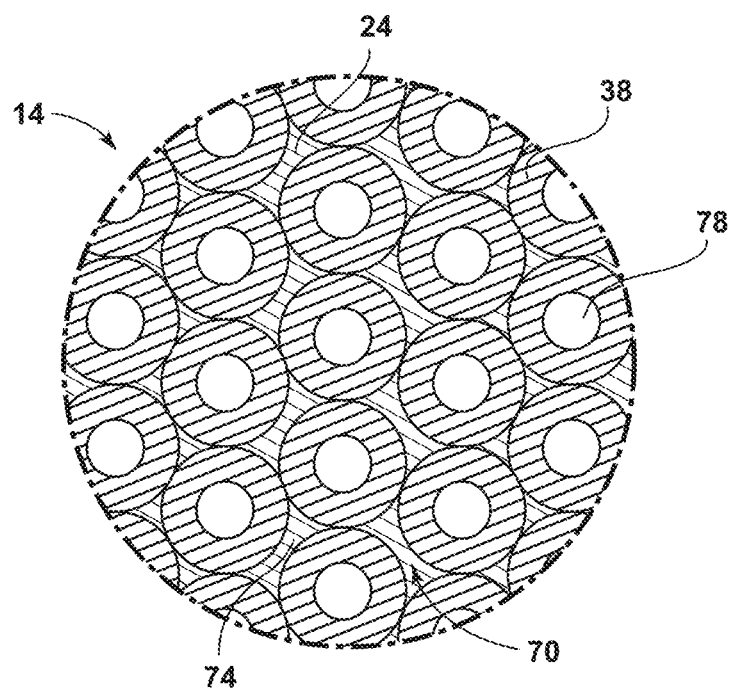
FIG. 5 is an enlarged cross-sectional view of an aspect of the multi-component insulation material.
Figure 6:
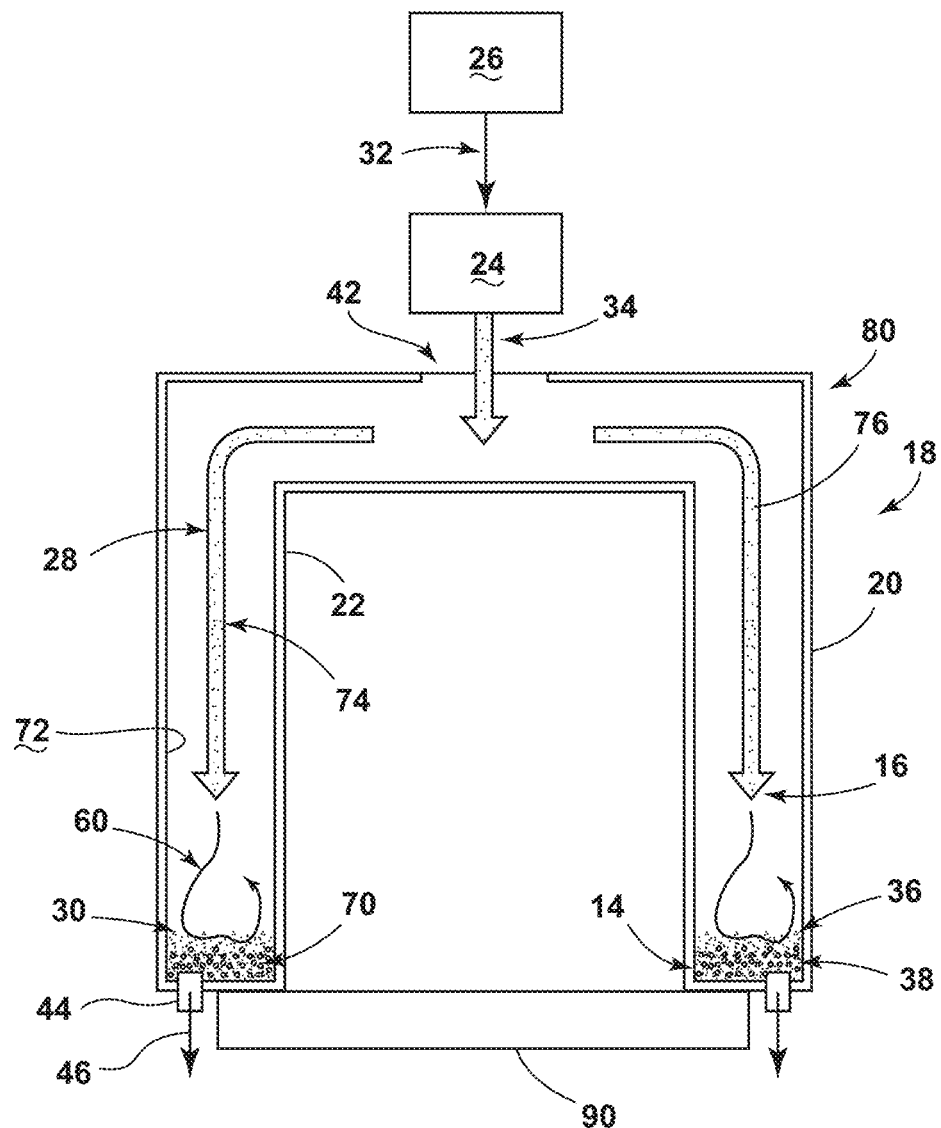
FIG. 6 is a schematic section view of a device for depositing and evenly distributing an aspect of the multi-component insulation material evenly throughout the insulating cavity.
Figure 7:
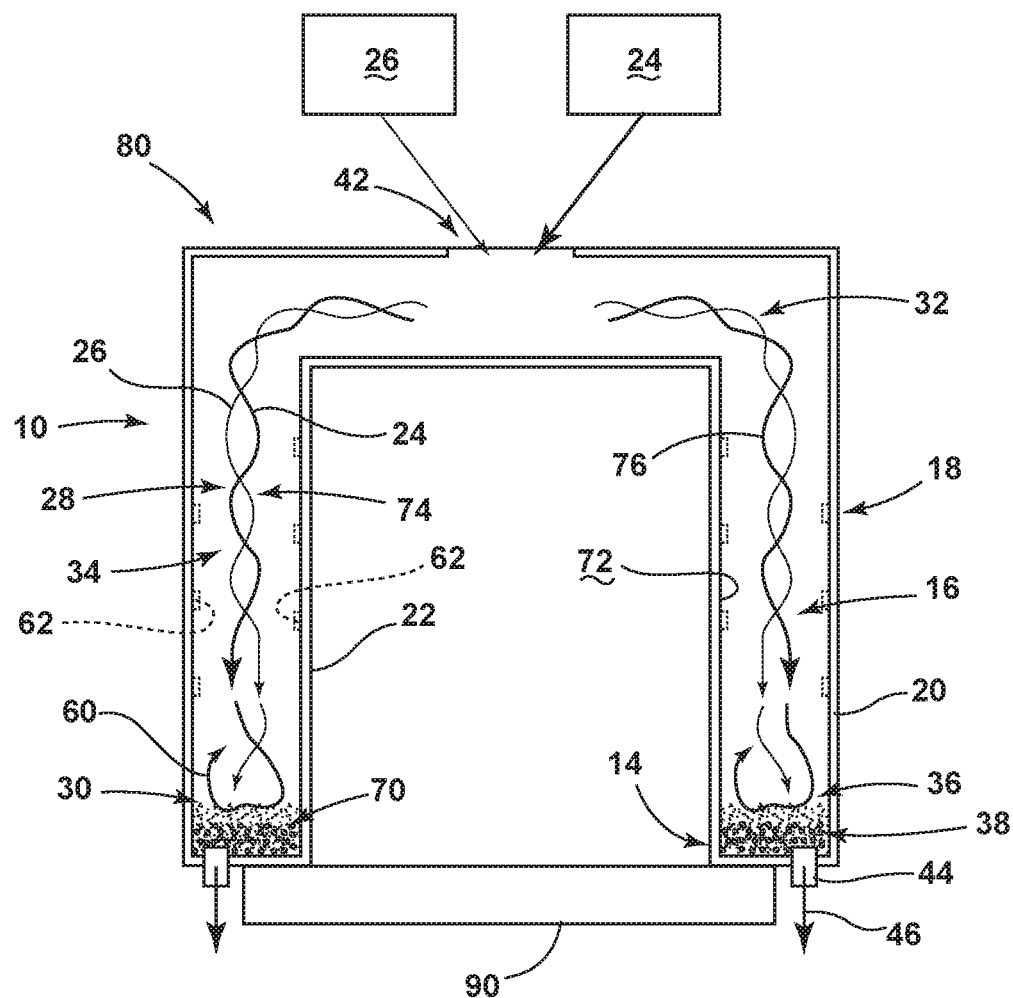
FIG. 7 is a schematic section view of a device for depositing and evenly distributing an aspect of the multi-component insulation material evenly throughout the insulating cavity.
Figure 8:
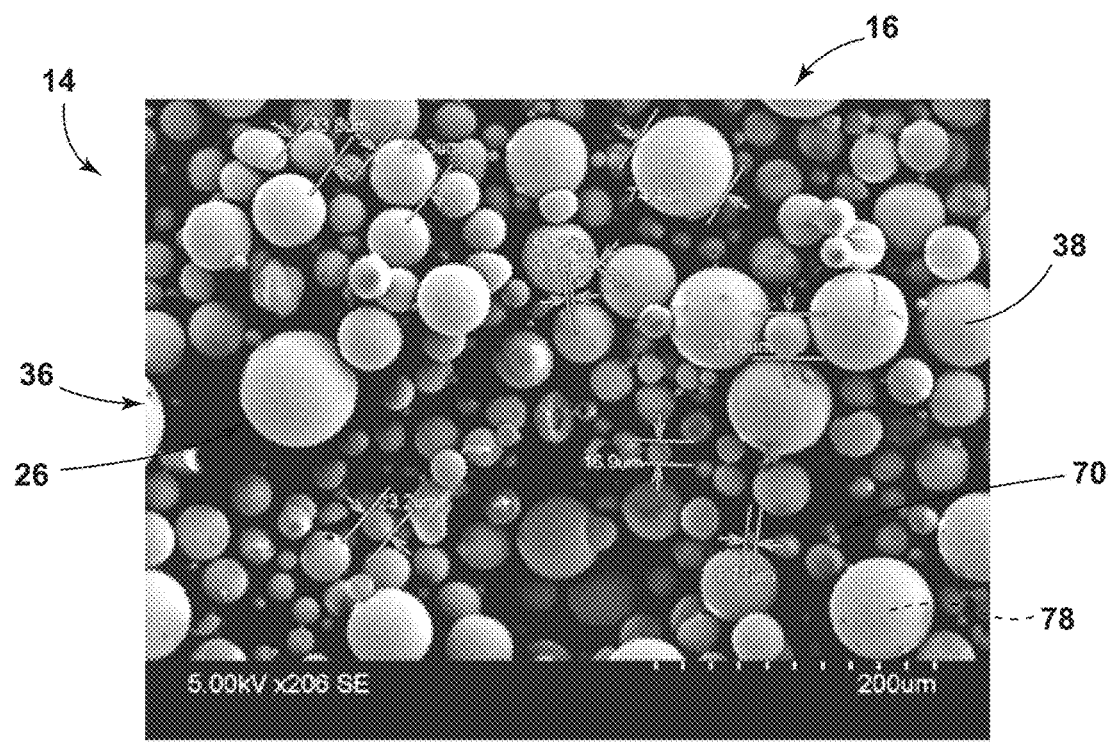
FIG. 8 is an enlarged perspective view illustrating an aspect of a multi-component insulating material incorporating a particulate material and an insulating gas.
Figure 9:
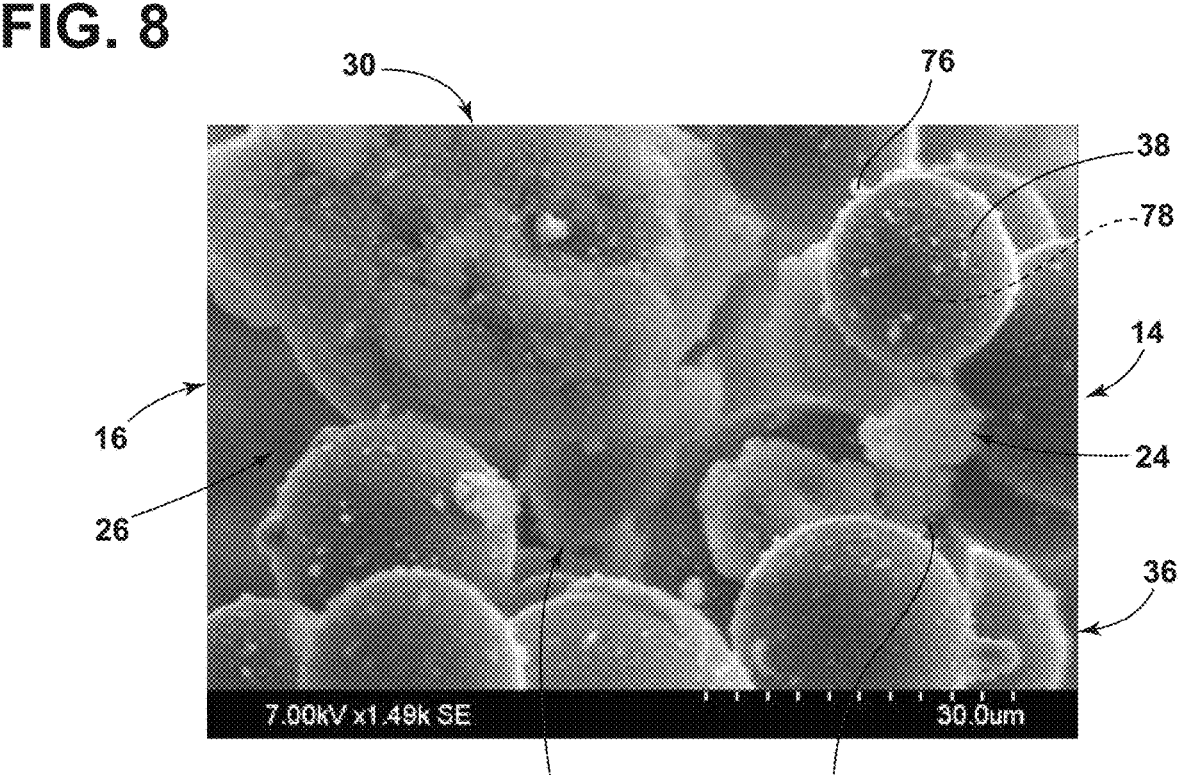
FIG. 9 is a perspective view of a multi-component insulating material incorporating multiple forms of particulate material and an insulating gas.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-9, reference numeral 10 generally refers to an insulating structure for an appliance 12, where the insulating structure 10 includes a multi-component insulating material 14 having thermal and/or acoustical insulating properties. According to the various embodiments, the individual components of the multi-component insulating material 14 are disposed within the insulating cavity 16 to be placed in a substantially uniform configuration throughout the insulating cavity 16 of the insulating structure 10. According to the various embodiments, an insulating structure 10 for an appliance 12 includes a cabinet 18 having an outer wrapper 20 and an inner liner 22, where the insulating cavity 16 is defined therebetween. An insulating powder material 24 can be disposed throughout the insulating cavity 16. It is contemplated that an insulating gas carrier 26 can also be disposed within the insulating cavity 16, where the insulating powder material 24 is combined with the insulating gas carrier 26 to cooperatively define a suspended state 28 and a precipitated state 30.

According to the various embodiments, the suspended state 28 is defined by the insulating gas carrier 26 in motion or in an active state 32 and the insulating powder material 24 being an aeolian suspension 34 within the insulating gas carrier 26 while in motion in the active state 32. Typically, the active state 32 of the insulating gas carrier 26 is defined within the insulating cavity 16 before the insulating cavity 16 is sealed and enclosed.

Referring again to FIGS. 1-9, the precipitated state 30 of the insulating powder material 24 and the insulating gas carrier 26 is defined by the insulating gas carrier 26 being substantially in a deposition state 36 and the insulating powder material 24 being precipitated from the insulating gas carrier 26 and deposited within the insulating cavity 16. It is contemplated that in addition to the insulating powder material 24, a plurality of hollow insulating spheres 38 can also be disposed in the insulating cavity 16, where various combinations of the insulating powder material 24, insulating gas carrier 26, and plurality of hollow insulating spheres 38 cooperatively define the multi-component insulating material 14 disposed within the insulating cavity 16. It is further contemplated that these components can be disposed in a substantially uniform configuration throughout the entire insulating cavity 16 such that the instance of pockets, sections or other portions of only one component of the multi-component insulating material 14 is substantially minimized. Various methods for achieving the uniform distribution of the individual components of the multi-component insulating material 14 will be discussed in greater detail below.

According to the various embodiments, as exemplified in FIGS. 1-9, it is contemplated that the insulating gas carrier 26 can be at least one of argon, neon, carbon dioxide, xenon, krypton, combinations thereof, and other similar insulating gasses that typically have insulating properties greater than that of air. In addition, the hollow insulating spheres 38 can be made of various organic and/or inorganic materials that include, but are not limited to, glass, ceramic, polymers, combinations thereof, and other similar organic and/or inorganic materials. It is further contemplated that the insulating powder material 24 can be defined by various particulate material that can include, but is not limited to, fumed silica, precipitated silica, nano-sized and/or micro-sized aerogel powder, rice husk ash powder, perlite, cenospheres, diatomaceous earth, combinations thereof, and other similar insulating particulate material. The insulating powder material 24 can be disposed within the insulating cavity 16 of the cabinet 18 in various configurations, where such configurations include an uncompressed powder state, or can be disposed where the insulating powder material 24 includes compressed portions that define a densified insulating granular material. In such an embodiment, the insulating granular material can be surrounded by uncompressed portions of the insulating powder material 24, the insulating gas carrier 26, hollow insulating spheres 38, combinations thereof, and other similar insulating materials. In the various configurations of the insulating powder material 24, the insulating powder material 24 defines porous areas 40 defined between the individual particles and/or granules of the insulating powder material 24. It is contemplated that the insulating gas carrier 26 can occupy the various porous areas 40 that are defined between the particles of the insulating powder material 24. It is further contemplated that individual particles of the insulating powder material 24 can occupy the porous areas 40 between the hollow insulating spheres 38 and/or granular portions of the insulating powder material 24.

Referring again to FIGS. 2-9, it is contemplated that in order to deposit the various components of the multi-component insulating material 14 into the insulating cavity 16 of the cabinet 18, the cabinet 18 can include one or more inlet ports through which the insulating powder material 24 and the insulating gas carrier 26 are injected into the insulating cavity 16. During injection of the insulating powder material 24 and the insulating gas carrier 26 that combine to form the aeolian suspension 34, one or more vacuum ports 44 of the cabinet 18 can be used to express portions of gas 46, such as air, that may be present within the insulating cavity 16. It is also contemplated that during the expression of gas 46 through the vacuum port 44, portions of the insulating gas carrier 26 can also be expressed. In this manner, as the aeolian suspension 34 of the insulating gas carrier 26 and insulating powder material 24 flow through the insulating cavity 16, the expression of the insulating gas carrier 26 provides for substantially continuous flow of the aeolian suspension 34 through the entire insulating cavity 16. In this manner, precipitation of the insulating powder material 24 from the aeolian suspension 34 can be substantially consistent throughout the insulating cavity 16. In this manner, the aeolian suspension 34 can be used to distribute, in a substantially uniform pattern, at least the insulating gas carrier 26 and the insulating powder material 24. As the insulating gas carrier 26 is expressed, it is contemplated that at least a portion of the expressed insulating gas carrier 26 can be recycled for later use in combining with the insulating powder material 24 to form the aeolian suspension 34 for further deposition of the insulating powder material 24.

According to the various embodiments, the aeolian suspension 34 of the insulating gas carrier 26 and the insulating powder material 24 can occur as the insulating gas carrier 26 moves past, through, or proximate to the insulating powder material 24. The fine particle size of the insulating powder material 24 makes the individual particles of the insulating powder material 24 light enough that they can be carried through movement of the insulating gas carrier 26, and suspended within the insulating gas carrier 26 to form the aeolian suspension 34. Due to the movement of the aeolian suspension 34 within the insulating cavity 16 of the cabinet 18, deposition of the insulating powder material 24 from the aeolian suspension 34 occurs. This deposition can be caused by various eddies 60, areas of turbulence within the insulating cavity 16, and other aerodynamic features that slow, re-direct or otherwise modify the flow of the aeolian suspension 34 through the insulating cavity 16. These eddies 60 can be produced by structures disposed within the insulating cavity 16 such as hollow insulating spheres 38, turbulence producing structures 62 attached to the inner liner 22 and/or the outer wrapper 20, combinations thereof and other similar turbulence producing features. Such modification of the flow of the aeolian suspension 34 results in the deposition of the insulating powder material 24 from the aeolian suspension 34. As a result of the injection of the aeolian suspension 34, the insulating cavity 16 is eventually filled with the precipitated insulating powder material 24 to fill all of, or substantially all of, the insulating cavity 16 of the cabinet 18. As will be described more fully below, the aeolian suspension 34 can be injected into a substantially hollow insulating cavity 16, or can be injected into an insulating cavity 16 that includes one or more components of the multi-component insulating material 14, where such components can include, but are not limited to, hollow insulating spheres 38, granular portions of the insulating powder material 24, foam insulation, organic fiber, inorganic fiber, combinations thereof or other insulating material that includes various porous areas 40 between individual particles.

Referring again to FIGS. 5-14, the insulation structure for the appliance 12 can include a cabinet 18 having the outer wrapper 20 and the inner liner 22, with the insulating cavity 16 defined therebetween. According to various embodiments, a plurality of hollow insulating spheres 38 can be disposed within the insulating cavity 16. In such an embodiment, a secondary insulating volume 70 is defined between the plurality of hollow insulating spheres 38 and the interior surface 72 of the cabinet 18. The interior surface 72 of the cabinet 18 serves to define the insulating cavity 16. An insulating fill material 74 is disposed within the secondary insulating volume 70, where the insulating fill material 74 and the plurality of hollow insulating spheres 38 define the uniformly distributed multi-component insulating material 14. The insulating fill material 74 can be made of various particulate and gaseous matter that can include, but is not limited to, nano-sized and/or micro-sized porous material in the form of any one or more of fumed silica, precipitated silica, aerogel powder, perlite, rice husk ash powder, diatomaceous earth, cenospheres, combinations thereof, and other nano/micro-sized particulate material 76, such as the insulating powder material 24. The nano-sized porous material can also include at least one opacifier, including, but not limited to carbon black, silicon carbide, combinations thereof and other opacifiers. The insulating fill material 74 can also include an insulating gas carrier 26, where the insulating gas carrier 26 includes, but is not limited to, argon, neon, carbon dioxide, xenon, krypton, combinations thereof, and other similar insulating gasses.

According to the various embodiments, the hollow insulating spheres 38 can include an interior region 78 that is filled with one or more insulating gasses, sulfur, other gaseous material, or can include a low pressure region that defines a partial vacuum within the interior region 78 of the hollow insulating sphere 38.

According to the various embodiments, it is contemplated that the insulating cavity 16 that contains the uniform distribution of the multi-component insulating material 14 is hermetically sealed to contain the multi-component insulating material 14 within the insulating cavity 16. In such an embodiment, it is contemplated that the insulating cavity 16 further defines an at least partial vacuum to create a vacuum insulated structure 80. It is further contemplated that the vacuum insulated structure 80 can be a vacuum insulated cabinet 18 for an appliance 12, a vacuum insulated panel that can be disposed within a cabinet 18 of an appliance 12, various vacuum insulated structures 80 for appliances 12 and other fixtures, as will be described more fully below.

Referring again to FIGS. 5-14, where the hollow insulating spheres 38 are one of the components of the multi-component insulating material 14, it is contemplated that each hollow insulating sphere 38 can include an outside diameter in a range of from approximately 50 nanometers to approximately 300 microns. It is also contemplated that the hollow insulating spheres 38 can be defined by various nano-spheres that can include a diameter in a range of from approximately 50 nanometers to approximately 1000 nanometers. It is further contemplated that other sized microspheres and nano-spheres can be included individually or in combination with other sized microspheres and nano-spheres to provide a better fill rate within the insulating cavity 16 of the hollow insulating spheres 38 and also the other components of the multi-component insulating material 14. In the various embodiments, it is contemplated that the secondary insulating volume 70 defined between the adjacent hollow insulating spheres 38 in a closed packed situation within the insulating cavity 16 can include a thickness in a range of from approximately 40 nanometers to approximately 200 microns. Sub-nanometer thicknesses of portions of the secondary insulating volume 70 are also contemplated. It is also contemplated that this secondary insulating volume 70 is large enough to receive other components of the multi-component insulating material 14, such as the insulating powder material 24 in the powder or granular form, as well as the insulating gas carrier 26. According to various embodiments, it is further contemplated that the secondary insulating volume 70 includes areas that are large enough to receive and allow the aeolian suspension 34 to pass between the individual hollow insulating spheres 38 to allow for precipitation of the insulating powder material 24 from the aeolian suspension 34 into the secondary insulating volume 70.

According to the various embodiments, in addition to the use of the aeolian suspension 34, various vibrating mechanisms 90 can be used to ensure that the multi-component insulating material 14 is tightly packed and substantially evenly distributed throughout the insulating cavity 16. Rotating mechanisms and air-pump mechanisms for generating an at least partial vacuum can also be implemented to tightly pack the multi-component insulating material 14 within the insulating cavity. In this manner, it is contemplated that the various hollow insulating spheres 38 of the plurality of hollow insulating spheres 38 that are disposed within the multi-component insulating material 14 are positioned to be in direct physical contact with at least one other adjacent hollow insulating sphere 38 of the plurality of hollow insulating spheres 38. It is also contemplated that at least a portion of the hollow insulating spheres 38 are separated from adjacent hollow insulating spheres 38 where the multi-component insulating material 14 includes larger proportions of the insulating powder material 24 and smaller proportions of the hollow insulating spheres 38.

According to the various embodiments, it is contemplated that the components of the multi-component insulating material 14 can be disposed within the insulating cavity 16 in a pattern, one at a time, or other sequential method. By way of example, and not limitation, it is contemplated that larger particles, such as the hollow insulating spheres 38, can be disposed in the insulating cavity 16 first, and progressively smaller particulate material can be disposed within the insulating cavity 16 thereafter. In this manner, as each smaller particle material is disposed with the insulating cavity 16, the spaces between the larger particulate material can be filled by the smaller particulate material. According to various embodiments, it is contemplated that any porous areas 40 that exist between the various particles of the multi-component insulating material 14 can be filled or otherwise occupied by an insulating gas carrier 26. Accordingly, the use of the multi-component insulating material 14 can be used to fill or substantially fill the entire insulating cavity 16. As discussed above, gas 46 disposed within the insulating cavity 16 can be expressed through one or more vacuum ports 44 to create the vacuum insulated structure 80. As further discussed above, the one or more gas inlets can be used in conjunction with the one or more vacuum ports 44 such that gas 46, such as air, that is expressed from the insulating cavity 16 can be replaced by an insulating gas carrier 26 to increase the insulating properties of the multi-component insulating material 14.

It is contemplated that the components and component proportions included within the multi-component insulating material 14 can vary depending upon the ultimate design, shape, size, desired performance, and other factors may bear on the ultimate design of the multi-component insulating material 14, and the appliance 12 as a whole.

Referring now to FIGS. 1-15, having described various aspects of an insulation structure for an appliance 12 and/or a vacuum insulation panel for an appliance 12, a method 400 is disclosed for forming an insulating structure 10. According to the method 400, an insulating member, such as a cabinet 18 or panel, can be formed, where the insulating member includes an interior surface 72 that defines an insulating cavity 16 (step 402). As discussed above, the insulating member can be in the form of a cabinet 18 having an inner liner 22 and an outer wrapper 20, or can be in the form of a panel member that can be formed into a vacuum insulation panel for installation within the insulating cavity 16 of an appliance 12. In addition to forming the insulating member, an insulating powder material 24 can be formed as part of the method 400 (step 404). The insulating powder material 24 can be made of various nano-sized and/or micro-sized particulate material that can include, but is not limited to, fumed silica, precipitated silica, aerogel powder, perlite, rice husk ash powder, diatomaceous earth, cenospheres, combinations thereof, and other similar insulating powders. As discussed above, the insulating powder material 24 can be compacted to form portions of higher density that can take the form of a granular insulation material.

Referring again to FIGS. 1-4 and 15, according to the method 400, after the insulating member and the insulating powder material 24 are formed, the insulating powder material 24 can be disposed within the insulating cavity 16 of the insulating member (step 406). In order to disperse the insulating powder material 24 throughout the insulating cavity 16, an insulating gas carrier 26 can be disposed into the insulating cavity 16 (step 408). In this manner, when in an active state 32 moving through the insulating cavity 16, the insulating gas carrier 26 carries at least a portion of the insulating powder material 24. This insulating powder material 24 can thereby be suspended within the insulating gas carrier 26 in the active state 32, which is referred to herein as the aeolian suspension 34. As the insulating gas carrier 26 and the insulating powder material 24 move through the insulating cavity 16, the insulating powder material 24 can be deposited into the insulating cavity 16 by slowing the movement of the insulating gas carrier 26 to define a deposition state 36 (step 410). When the insulating gas carrier 26 defines the deposition state 36, the insulating powder material 24 precipitates from the insulating gas carrier 26 and settles within the insulating cavity 16. In this manner, the insulating powder material 24 is deposited substantially throughout the insulating cavity 16. As discussed above, the step of depositing the insulating powder material 24 can be performed by causing eddies 60, aerodynamic turbulence, and/or other formations that can cause a change in the speed and/or direction of movement of the aeolian suspension 34. These changes in movement can result in the precipitation of the insulating powder materials 24 that are then deposited within the insulating cavity 16.

Referring again to FIGS. 1-4 and 15, in order to retain the insulating gas carrier 26 within the insulating cavity 16, the insulating member is sealed in an airtight fashion (step 412). According to various embodiments, at least a portion of the insulating gas carrier 26 and/or gasses 46 typically present within the insulating cavity 16, such as air, can be expressed from the insulating cavity 16, wherein the insulating member defines a vacuum insulated structure 80 (step 414).

Referring again to FIGS. 2-4, it is contemplated that the insulating gas carrier 26 and the insulating powder material 24 can be disposed within the insulating cavity 16 as the aeolian suspension 34. To form the aeolian suspension 34, it is contemplated that the insulating gas carrier 26 can be fed through a container having an amount of the insulating powder material 24. As the insulating gas carrier 26 moves through the insulating powder material 24, the insulating powder material 24 becomes suspended within the insulating gas carrier 26 moving in the active state 32. The insulating gas carrier 26 in the active state 32, within which the insulating powder material 24 is suspended, is then delivered to the insulating cavity 16 of the insulating structure 10 so that the insulating powder material 24 can be deposited therein. It is also contemplated that the aeolian suspension 34 can be formed within the insulating cavity 16 of the insulating structure 10. In such an embodiment, the insulating powder material 24 can be injected, dropped, delivered, or otherwise disposed within the insulating cavity 16 and the insulating gas carrier 26 can be blown or otherwise injected along separate paths that at least partially intersect within the insulating cavity 16. In this manner, the insulating gas carrier 26 moves through portions of the insulating powder material 24 and forms the aeolian suspension 34 that, in turn, moves through the insulating cavity 16.

According to the various embodiments, it is contemplated that the insulating gas carrier 26 can include, but is not limited to, argon, neon, carbon dioxide, xenon, krypton, combinations thereof, and other similar insulating gasses.

Referring again to FIGS. 2-4, in order to dispose the insulating gas carrier 26 and the insulating powder material 24 into the insulating cavity 16, either individually, or combined as the aeolian suspension 34, the insulating structure 10 can include at least one inlet port 42 through which the insulating powder material 24 and the insulating gas carrier 26 can be injected into the insulating cavity 16. In order to foster the movement of the insulating gas carrier 26 through the insulating cavity 16, the insulating member can include one or more vacuum ports 44 from which gas 46 and portions of the insulating gas carrier 26 can be expressed from the insulating cavity 16. The expression of the gas 46 and insulating gas carrier 26 from the interior cavity can further the movement of the insulating gas carrier 26 in the active state 32 to allow the aeolian suspension 34 to be delivered throughout the insulating cavity 16 for even deposition of the insulating powder material 24 throughout the insulating cavity 16. In order to further the deposition of the insulating powder material 24, the one or more vacuum ports 44 can be configured to permit expression of the insulating gas carrier 26 and the gas 46 through the vacuum port 44. Each vacuum port 44 is further configured to substantially retain the insulating powder material 24 within the insulating cavity 16. Accordingly, each vacuum port 44 is sized to permit the movement of gas 46 and the insulating gas carrier 26 therethrough, but includes a filter mechanism and/or a sized opening or openings that substantially prevent the movement of the insulating powder material 24 to move therethrough. Accordingly, the insulating powder material 24 can be retained within the insulating cavity 16 to eventually fill, or substantially fill, the insulating cavity 16.

According to the various embodiments, it is contemplated that the method 400 can be used in conjunction with larger particles that are disposed within the insulating cavity 16 either before the aeolian suspension 34 is introduced or during injection of the aeolian suspension 34 into the insulating cavity 16. These larger particles can include a granular form of the insulating powder material 24, hollow insulating spheres 38, and other similar larger particle insulating materials. When the aeolian suspension 34 is injected through these larger materials, it is contemplated that the use of the vacuum port 44 to draw gas 46 and the insulating gas carrier 26 out from the insulating cavity 16 can help to move the aeolian suspension 34 in the pores and spaces defined between the larger particle material of the multi-component insulating material 14. In this manner, the combination of the larger particle materials and the aeolian suspension 34 can serve to uniformly distribute the various components of the multi-component insulating material 14 through the insulating cavity 16.

Referring now to FIGS. 2-4 and 16, a method 500 is disclosed for forming an insulation member within an insulating structure 10. According to the method 500, an insulating powder material 24 is formed (step 502) and the insulating powder material 24 is suspended within an insulating gas carrier 26 to form an aeolian suspension 34 (step 504). In such an embodiment, the insulating gas carrier 26 is moved through the insulating powder material 24 such that the insulating powder material 24 can become suspended within the insulating gas carrier 26. The aeolian suspension 34 is then deposited within an insulating cavity 16 defined within an insulating structure 10 (step 506). At least a portion of the gas 46 and at least a portion of the insulating gas carrier 26 can then be expressed from the insulating cavity 16 to promote airflow and to circulate the aeolian suspension 34 through the entirety of the insulating cavity 16 (step 508). The movement of the aeolian suspension 34 is slowed such that the insulating powder material 24 can precipitate from the aeolian suspension 34 (step 510). In this manner, the insulating powder material 24 is deposited throughout the insulating cavity 16. When the insulating powder material 24 is deposited in the insulating cavity 16, the insulating gas carrier 26, having its movement slowed, changed in direction, or in some cases, stopped, can occupy various porous spaces defined between the particles of the insulating powder material 24. Once the insulating powder material 24 and the insulating gas carrier 26 are uniformly distributed through the insulating cavity 16, the insulating powder material 24 and insulating gas carrier 26 can be sealed within the insulating cavity 16 to define a vacuum insulated structure 80 (step 512).

Referring now to FIGS. 5-14 and 17, a method 600 is disclosed for forming an insulating structure 10. The method 600 includes forming an insulating member (step 602). As discussed above, the insulating member can include an interior surface 72 that defines an interior insulating cavity 16. According to the method 600, a plurality of hollow insulating spheres 38 can be formed (step 604), where the hollow insulating spheres 38 are formed by moving micro- and/or nano-sized particles of organic and/or inorganic material along with a blowing agent through a flame, where the flame causes the blowing agent to decompose and release a high-temperature gas 46 that causes the particles of organic and/or inorganic material to expand, thereby forming the hollow insulating spheres 38. As discussed above, these hollow insulating spheres 38 can include nano-spheres, microspheres, and other sized hollow insulating spheres 38 that have an outside diameter in the range of from approximately 50 nanometers to approximately 300 microns.

Referring again to FIGS. 5-14 and 17, in addition to forming the hollow insulating glass spheres 38, a fill material 74 is also formed (step 606). According to various embodiments, the fill material 74 can be defined by a nano/micro-sized particulate material. The hollow insulating spheres 38 and the nano/micro-sized particulate material can then be disposed within the interior insulating cavity 16 (step 608). It is contemplated that the hollow insulating spheres 38 and the nano/micro-sized particulate material can be disposed within the interior insulating cavity 16 at the same time. Alternatively, it is contemplated that the hollow insulating spheres 38, typically being larger, can be disposed within the insulating cavity 16 before the nano/micro-sized particulate material. In this manner, the nano/micro-sized particulate material can infiltrate the secondary insulating volume 70 defined between adjacent hollow insulating spheres 38. As discussed above, the thickness of the secondary insulating volume 70 in a closed pack situation within the insulating cavity 16 can be in the range of from approximately 40 nanometers to approximately 200 microns. Sub-nano level thicknesses within the secondary insulating volume 70 are also contemplated. Because the nano/micro-sized particulate material is smaller than the gaps that define the secondary insulating volume 70, the nano/micro-sized particulate material can be dispersed throughout the secondary insulating volume 70 defined within an interior insulating cavity 16 and within the interstitial space defined between the plurality of hollow insulating spheres (step 610). In this manner, the nano/micro-sized particulate material and the hollow insulating spheres at least partially define the uniformly distributed multi-component insulating material 14.

Referring again to FIGS. 5-14, it is contemplated that the nano/micro-sized particulate material can be distributed into the secondary insulating volume 70 through the use of a vibrating mechanism 90. In this manner, the vibrating mechanism 90 can cause a vibration of the insulating structure 10 and, in turn, the various components of the multi-component insulating material 14 such that the nano/micro-sized particulate material can be shaken between the interstitial space defined between the hollow insulating spheres 38 such that the nano/micro-sized particulate material can occupy substantially all of the secondary insulating volume 70 between the hollow insulating spheres 38. It is also contemplated that the dispersion of the nano/micro-sized particulate material can be performed by injecting the insulating gas carrier 26 into the interior insulating cavity 16. In this manner, the insulating gas carrier 26 can cause the nano/micro-sized particulate material to become suspended therein to form the aeolian suspension 34. The aeolian suspension 34 of the insulating gas carrier 26 and the nano/micro-sized particulate material can circulate through the insulating cavity 16 and cause the deposition of the nano/micro-sized particulate material throughout the secondary insulating volume 70. As discussed above, the vacuum port 44 can be used in conjunction with the aeolian suspension 34 to cause the circulation of the aeolian suspension 34 through the secondary insulating volume 70 within the insulating cavity 16.

According to the various embodiments, it is contemplated that the hollow insulating insulating spheres 38 and the nano/micro-sized particulate material can be combined within the insulating cavity 16 at the same time, such that the hollow insulating spheres 38 and the nano/micro-sized particulate material are disposed through the one or more inlet port 42 at the same time. It is also contemplated that the insulating structure 10 can include multiple inlet ports 42, where each inlet port 42 is dedicated for depositing either the hollow insulating spheres 38 or the nano/micro-sized particulate material into the interior cavity. It is also contemplated that the hollow insulating spheres 38 and the nano/micro-sized particulate material can define a pre-mixed insulating material that is combined before being deposited into the interior insulating cavity 16. In such an embodiment, it is contemplated that the pre-mixed insulating material can be directly disposed within the insulating cavity 16. It is also contemplated that the pre-mixed insulating material can be disposed into the insulating cavity 16 along with an insulating gas carrier 26, such that the insulating gas carrier 26 provides for the substantially even and uniform movement of the components of the multi-component insulating material 14 throughout the insulating cavity 16.

According to various embodiments, it is contemplated the use of the insulating gas carriers 26 can cause hollow insulating spheres 38, such as nano-spheres or microspheres, to become suspended within the insulating gas carrier 26. In this manner, the aeolian suspension 34 can be used to distribute the hollow insulating spheres 38, the nano/micro-sized particulate material, and other components of the multi-component insulating material 14 throughout the insulating cavity 16. It is contemplated that certain components of the multi-component insulating material 14 may be too large to be suspended within the insulating gas carrier 26 moving in the active state 32. In such an embodiment, it is contemplated that such a material that may be substantially free of suspension within the insulating gas carrier 26 can be deposited separately, typically before, the aeolian suspension 34 is introduced into the insulating cavity 16.

Referring again to FIGS. 5-13 and 18, a method 700 is disclosed for forming a multi-component insulating material 14 to be used in an insulating structure 10, such as an appliance 12. According to the method 700, a plurality of hollow insulating spheres 38 are formed, wherein a secondary insulating volume 70 is defined within an interstitial space defined between the plurality of hollow insulating spheres 38 (step 702). As discussed above, the hollow insulating spheres 38 can include microspheres having a diameter of from approximately 15 microns to approximately 300 microns and can also include nano-spheres that have a diameter of from approximately 50 nanometers to approximately 1000 nanometers. It is contemplated that hollow insulating spheres 38 having larger and smaller diameters can be used within the insulating cavity 16 and as part of the multi-component insulating material 14. According to the method 700, a fill material 74 is also formed (step 704). It is contemplated that the fill material 74 can be defined by the nano/micro-sized particulate material, nano/micro-spheres, the insulating powder material 24, combinations thereof, and other nano/micro-sized insulating particulate material. The nano/micro-sized particulate material is then dispersed throughout the secondary insulating volume 70 defined between the hollow insulating spheres 38 (step 706). In this manner, the nano/micro-sized particulate material and hollow insulating spheres 38 at least partially define the substantially uniform dispersion of the various components of the multi-component insulating material 14 throughout a particular space. It is contemplated that the multi-component insulating material 14 can be formed outside of the insulating cavity 16 and disposed therein after formation of the multi-component insulating material 14. It is also contemplated that the multi-component insulating material 14 can be formed within the insulating cavity 16, such that various components are disposed within the insulating cavity 16 one at a time or in smaller combinations to ultimately form the multi-component insulating material 14.

Figure 10:
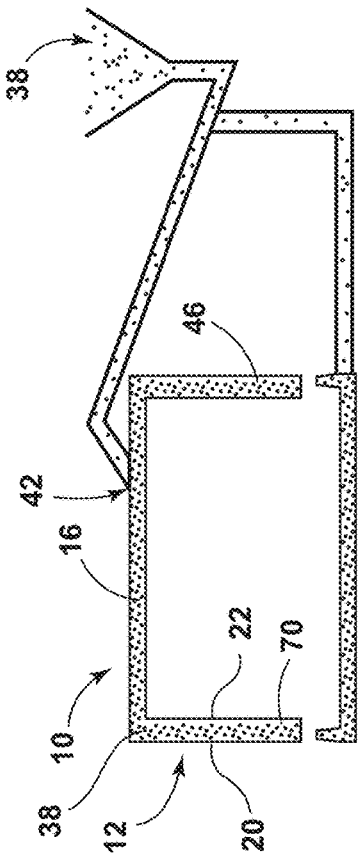
FIG. 10 is a schematic cross-sectional view of an insulating structure for an appliance.
Figure 11:
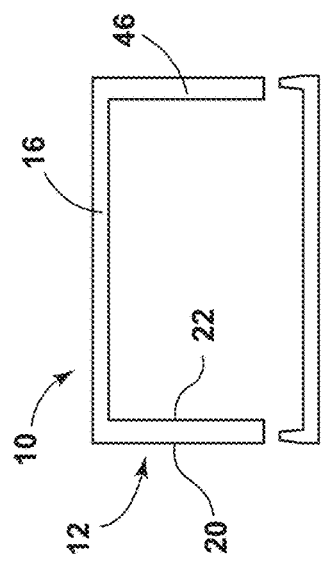
FIG. 11 is a schematic cross-sectional view of an insulating structure for an appliance being injected with at least one component of a multi-component insulation material.
Figure 12:
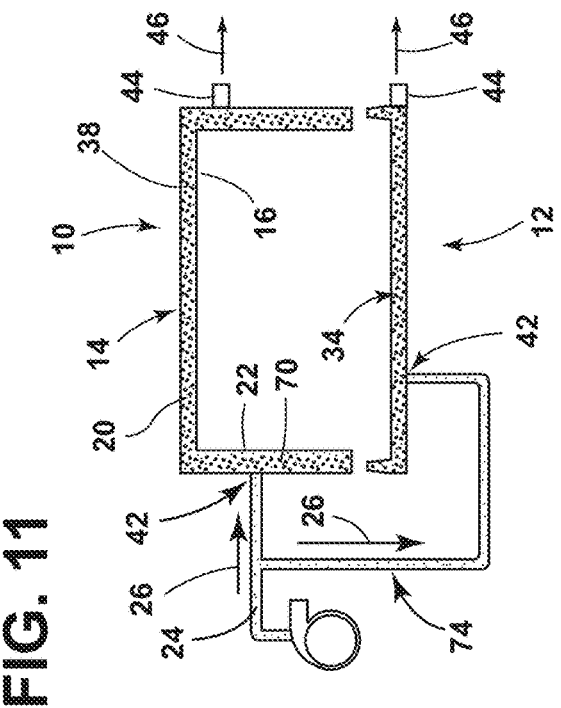
FIG. 12 is a schematic cross-sectional view of the insulating structure of FIG. 11 showing the injection of a second component of the multi-component insulation material.
Figure 13:
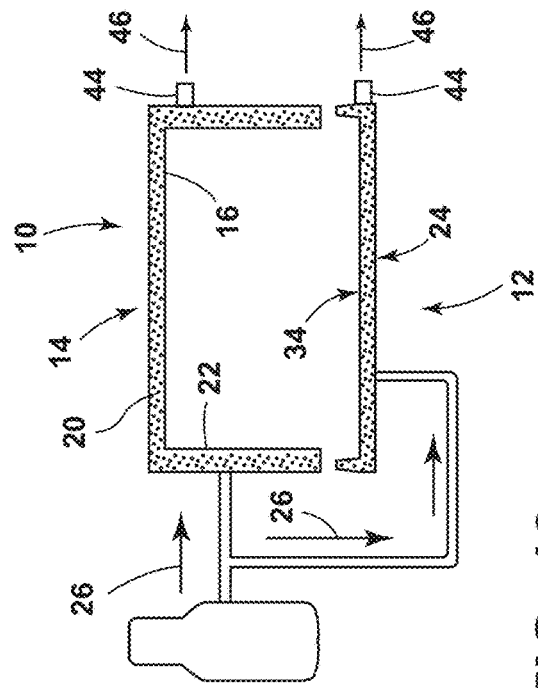
FIG. 13 is a schematic cross-sectional view of the insulating structure of FIG. 12 illustrating the injection of a third component of the multi-component insulation material.
Figure 14:
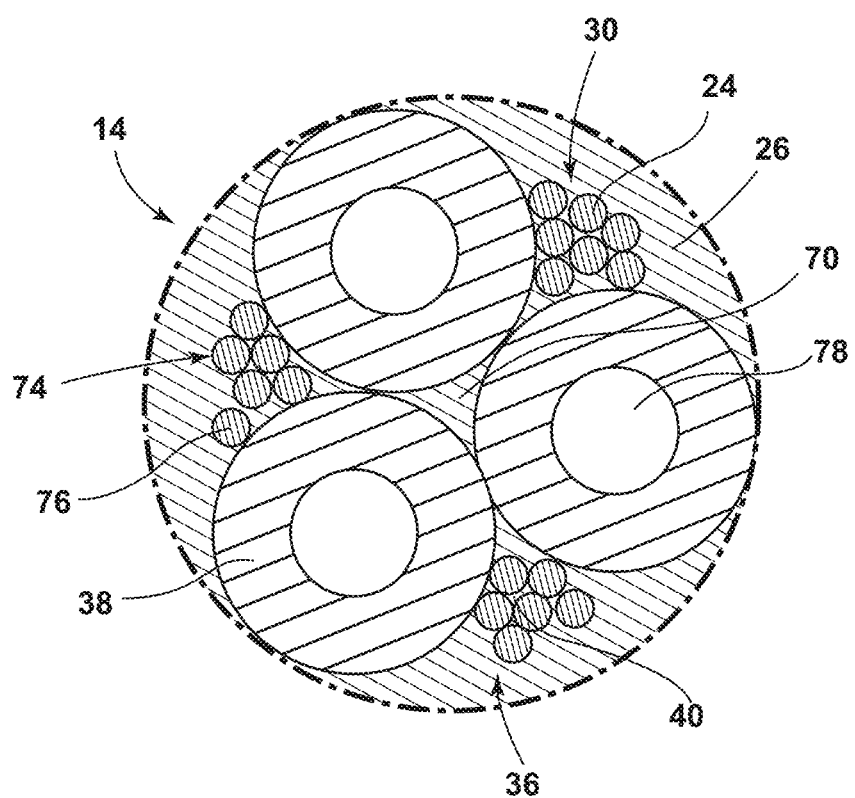
FIG. 14 is an enlarged cross-sectional view of an aspect of the multi-component insulation material installed within an insulating cavity for an appliance.
Figure 15:
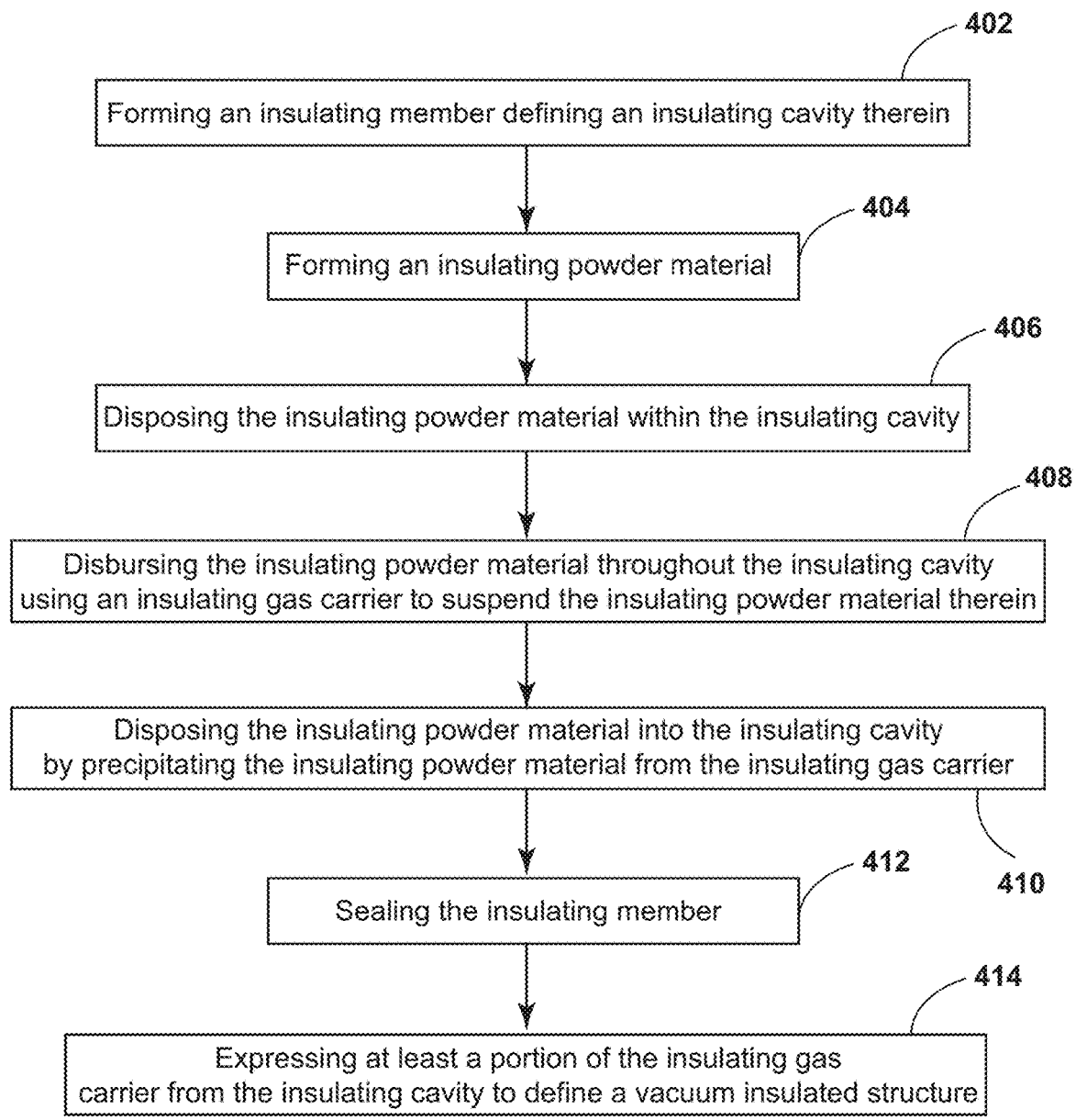
FIG. 15 is a schematic flow diagram illustrating a method for forming an insulating structure.
Figure 17:
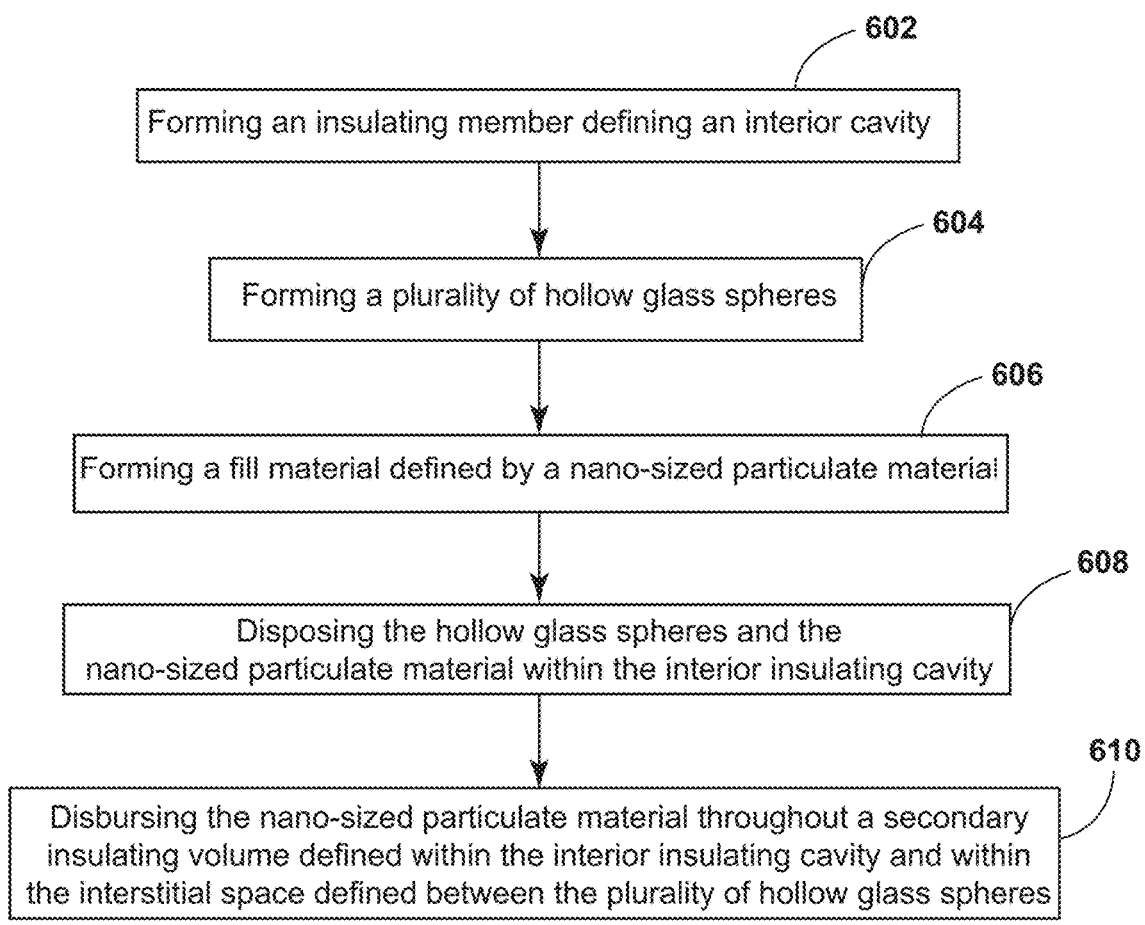
FIG. 17 is a schematic flow diagram illustrating a method for forming an insulated structure.
Figure 18:
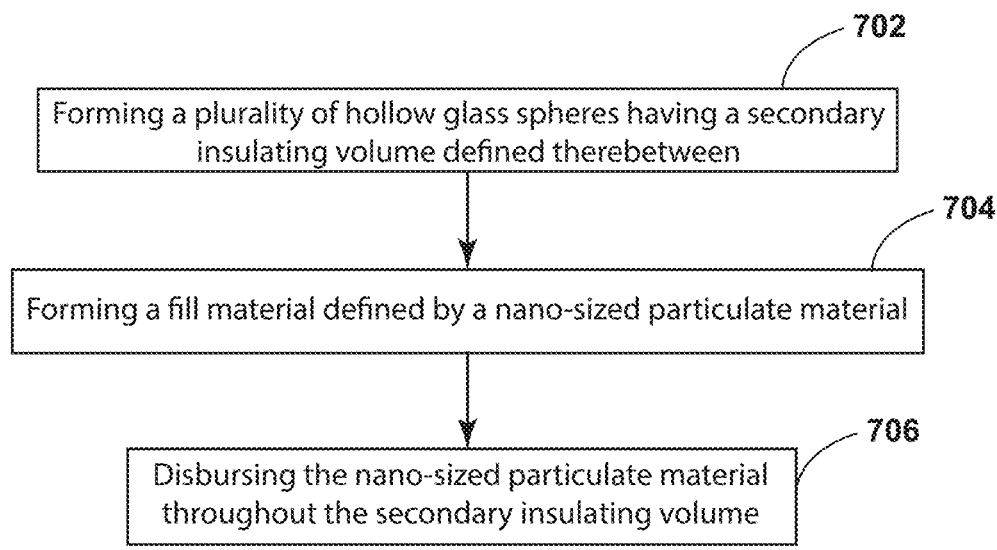
FIG. 18 is a schematic flow diagram illustrating a method for forming an insulating member within an insulating structure.

Referring to FIGS. 10-13, according to an exemplary process for forming the multi-component insulating material 14, the insulating cavity 16 of the insulating structure 10 is provided (as exemplified in FIG. 10). It is contemplated that the insulating structure 10 can be a cabinet 18, door, panel, or other unit of an insulating structure 10 for an appliance 12. It is also contemplated that the insulating structure 10 can be a panel member that ultimately forms a vacuum insulated panel that is separately installed within the insulating structure 10. According to the exemplary process illustrated in FIGS. 10-13, FIG. 10 exemplifies the deposition of the hollow insulating spheres 38 within the insulating structure 10. Typically, the hollow insulating spheres 38 represent the component having the largest particle size of the multi-component insulating material 14. As exemplified in FIG. 12, the nano/micro-sized particulate material can be blown into the insulating cavity 16 to occupy the secondary insulating volume 70 defined between the hollow insulating spheres 38. It is contemplated that an insulating gas carrier 26 can be used to blow the nano/micro-sized particulate material into the insulating cavity 16. It is also contemplated that air or some other gaseous material can be used as a carrier for delivering the nano/micro-sized particulate material into the secondary insulating volume 70. According to FIG. 13, an insulating gas carrier 26 can then be injected into the insulating structure 10. Typically, a vacuum port 44 is used in conjunction with the inlet port 42, where the vacuum port 44 expresses gas 46, and at least a portion of the insulating gas carrier 26 from the insulating cavity 16. In this manner, the gas 46 expressed from the interior cavity can be replaced by the insulating gas carrier 26 to increase the insulating characteristics of the insulating structure 10. It is contemplated that each of the components of the multi-component insulating material 14 can define a homogenous, or substantially homogenous, material. In this manner, the nano/micro-sized particulate material can be substantially homogenous. Alternatively, the nano/micro-sized particulate material can include compressed portions of granulated insulating material spaced within the remainder of the nano/micro-sized particulate material. The result of the combination of the various components, as exemplified in FIG. 14, is a substantially even or uniform distribution of the various components of the multi-component insulating material 14 throughout the insulating cavity 16 of the insulating structure 10. In this manner, the insulating material 14 can provide thermal and/or acoustical insulating properties to the insulating cavity 16 of the appliance 10. Additionally, each of the components, having either gaseous characteristics or having different particle sizes, can, in combination, serve to occupy all, or substantially all, of the interior volume of the insulating cavity 16.

According to the various embodiments, it is contemplated that the insulating structure 10, when in the form of a cabinet 18, can include an inner liner 22 and outer wrapper 20 that are made up of various materials that can include, but are not limited to, high barrier plastic, metal, polymer, combinations thereof, and other substantially rigid materials that can form a hermetic seal. This seal can be formed by one of varying methods that can include, but are not limited to, crimping, folding, welding, adhering, adhesive bonding, fastening, combinations thereof, and other similar sealing techniques that can form a hermetic seal between like materials or dissimilar materials, depending upon the configuration of the insulating structure 10.

According to the various embodiments, while a refrigerating appliance 12 is exemplified in FIG. 1, it is contemplated that the various aspects of the device can be utilized within various fixtures and/or appliances 12, wherein the term "appliance" can include cabinets, doors, and/or insulating structures therefor. Such appliances 12 and/or fixtures can include, but are not limited to, freezers, refrigerators, coolers, ovens, dishwashers, laundry appliances, water heaters, household insulation systems, ductwork, piping insulation, acoustical insulation, and other insulating applications.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulation structure for an appliance, the insulation structure comprising:
   a cabinet having an outer wrapper and an inner liner, with an insulating cavity defined therebetween;
   an insulating powder material disposed substantially throughout the insulating cavity;
   turbulence producing structures attached to the cabinet and extending into the insulating cavity from one of the outer wrapper and the inner liner; and
   an insulating gas disposed within the insulating cavity, wherein the insulating powder material is combined with the insulating gas and cooperatively defines a suspended state and a precipitated state, wherein the suspended state is defined by the insulating gas being in motion and the insulating powder material being in an aeolian suspension within the insulating gas while in motion, and wherein the precipitated state is defined by the insulating gas being in a deposition state and the insulating powder material being precipitated from the insulating gas and deposited within the insulating cavity, wherein the turbulence producing structures extend only partially into the insulating cavity, and generate eddies within the aeolian suspension to deposit the insulating powder material throughout the insulating cavity.

2. The insulation structure of claim 1, wherein a plurality of hollow insulating spheres are disposed in the insulating cavity, and wherein the aeolian suspension deposits the insulating powder material within the plurality of hollow insulating spheres using the eddies produced by the turbulence producing structures.

3. The insulation structure of claim 1, wherein the insulating gas is at least one of argon, neon, carbon dioxide, xenon and krypton.

4. The insulation structure of claim 1, wherein the insulating powder material defines porous areas between particles of the insulating powder material, wherein the insulating gas occupies the porous areas.

5. The insulation structure of claim 1, wherein the insulating powder material includes at least one of fumed silica, precipitated silica and pearlite, rice husk ash powder, diatomaceous earth and cenospheres.

6. The insulation structure of claim 1, wherein the insulating powder material includes compressed portions that define insulating granular material, wherein the insulating granular material is surrounded by uncompressed portions of the insulating powder material and the insulating gas.

7. The insulation structure of claim 1, wherein the cabinet includes an inlet port through which the insulating powder material and the insulating gas are injected into the insulating cavity, and wherein the cabinet includes a vacuum port from which gas and portions of the insulating gas are expressed from the insulating cavity, and wherein the cabinet includes a door of the appliance.

8. An insulation structure for an appliance, the insulation structure comprising:
 a cabinet having an outer wrapper and an inner liner, with an insulating cavity defined therebetween;
 an insulating powder material disposed substantially throughout the insulating cavity;
 an insulating gas disposed within the insulating cavity; and
 turbulence producing structures disposed within the insulating cavity and extending from one of the inner liner and the outer wrapper, wherein the turbulence producing structures generate eddies within an aeolian suspension of the insulating powder material and the insulating gas, the eddies defining a precipitated state of the aeolian suspension that deposits the insulating powder material substantially throughout the insulating cavity, wherein the turbulence producing structures extend only partially into the insulating cavity.

9. The insulation structure of claim 8, wherein the turbulence producing structures are attached to an interior surface of the cabinet.

10. The insulation structure of claim 8, wherein the insulating powder material includes a plurality of hollow insulating spheres.

11. The insulation structure of claim 8, wherein the insulating gas is at least one of argon, neon, carbon dioxide, xenon and krypton.

12. The insulation structure of claim 8, wherein the insulating powder material defines porous areas between particles of the insulating powder material, wherein the insulating gas occupies the porous areas.

13. The insulation structure of claim 8, wherein the insulating powder material includes at least one of fumed silica, precipitated silica, pearlite, rice husk ash powder, diatomaceous earth and cenospheres.

14. The insulation structure of claim 8, wherein the insulating powder material includes compressed portions that define insulating granular material, wherein the insulating granular material is surrounded by uncompressed portions of the insulating powder material and the insulating gas.

15. The insulation structure of claim 8, wherein the cabinet includes an inlet port through which the insulating powder material and the insulating gas are injected into the insulating cavity as the aeolian suspension, and wherein the cabinet includes a vacuum port from which gas and portions of the insulating gas are expressed from the insulating cavity.

16. The insulation structure of claim 8, wherein the insulating cavity defines an at least partial vacuum.

\* \* \* \* \*